July 3, 1956  K. M. LAING  2,752,785
GRADUATED GLASSWARE AND METHOD OF MAKING
Filed Aug. 16, 1951

INVENTOR
KENNETH M. LAING

BY Oscar L. Spencer
ATTORNEY

United States Patent Office 2,752,785
Patented July 3, 1956

2,752,785

GRADUATED GLASSWARE AND METHOD OF MAKING

Kenneth M. Laing, New Kensington, Pa., assignor to Pittsburgh Plate Glass Company, a corporation of Pennsylvania Application August 16, 1951, Serial No. 242,153

4 Claims. (Cl. 73—323)

This invention pertains to graduated glassware such as thermometers, barometers and the like, usually of tubular shape and having scale markings or the like for indicating the position of a liquid meniscus, pointer or equivalent fiducial point.

In the process of reading the scales of such devices, and particularly in the case of laboratory instruments in which precision of measurement is important, errors often arise as a result of the fact that the line of sight from the observer's eye may not be perpendicular to the axis of the tubular element. Since the liquid meniscus (or pointer) is not generally (if ever) in the same plane as the scale markings, any angularity of the observer's line of sight results in an incorrect reading due to the apparent displacement of the fiducial or measuring point with respect to the scale indications. Such errors are known as parallax errors, and it is a principal object of the present invention to provide a way of graduating such instruments which will overcome these inaccuracies.

A further object of the invention is to provide a method of marking instruments of the above type such that the markings, for example scale divisions, are formed in the body of the glass tube or the like, and which markings will be permanent and practically indestructible.

Another object of the invention is to provide a method of marking glass instruments such that the markings extend entirely through the body of the instrument to provide an automatic indication to the observer by which he can be certain that his line of sight is accurately perpendicular to the length of the scale, thereby eliminating parallax errors.

Still another object of the invention is to provide a method for producing instruments, marked as above described, in a very simple and economical way.

An additional object of the invention is to devise an improved article or instrument of the type described; that is, one having scale markings inherently providing protection against parallax errors in reading.

Figure 1:
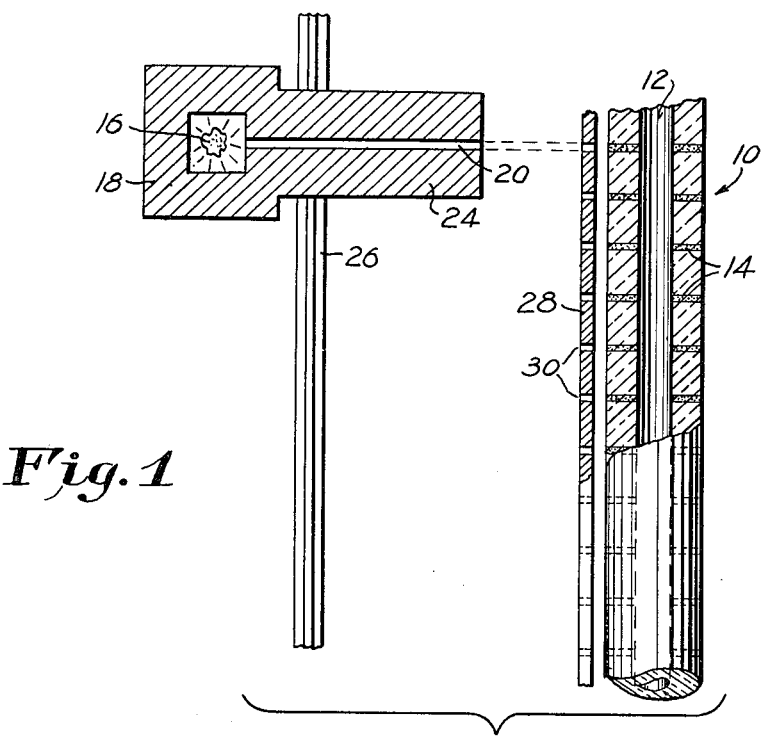
Figures 2, 3:
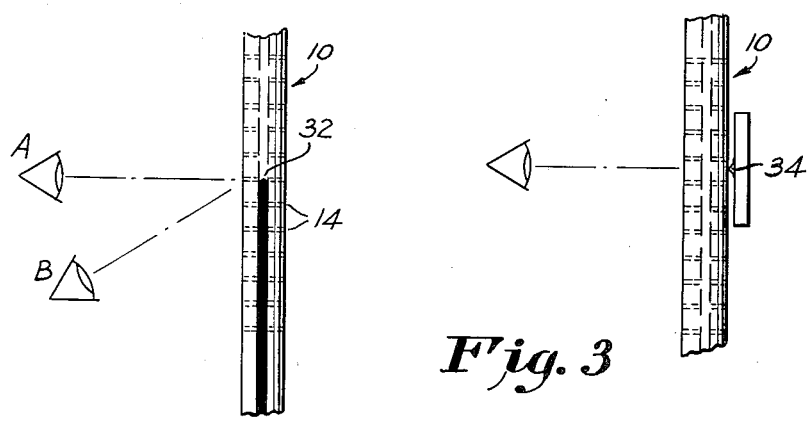

The above and other objects and advantages of the invention will best be understood by referring to the following detailed specification of a preferred way of practicing the invention, taken in connection with the appended drawings, in which:

Fig. 1 is a diagrammatic view showing one method of proceeding under the invention, with the article produced thereby being shown partly in vertical section, Fig. 2 is a view illustrating the anti-parallax feature of the article produced when reading the position of the meniscus of a liquid column, and Fig. 3 is a similar view showing the product of the invention as used in connection with a mechanical fiducial point or pointer.

In general, the invention contemplates the application of the well-known principle of marking glass in the body thereof by the discoloring effect of certain radiations. Such discoloring is well known, having been suggested for such purposes as making sun-glasses (U. S. Patent No. 1,169,571, Jan. 25, 1916, to Rosenthal), for the identification of glass articles (U. S. Patent No. 1,475,473, Nov. 27, 1923, to Drescher) and for other purposes. The techniques of producing localized discoloration by irradiation of suitable glasses with X-radiation, ultra-violet light and the radiation produced by radioactive disintegration are also well known, and the present invention does not depend for its utility upon any particular one of these materials or processes. Suffice it to say, for the purposes of the present disclosure, that the technique employed may be based upon the use of any suitable glass composition (of which the prior art affords many examples) such as those incorporating oxides of manganese, copper or equivalent colorable material, and upon the use of any convenient source of the discoloring radiation.

Referring to Fig. 1 of the drawings, there is shown (partly broken away) a portion of a tubular glass instrument 10 such as a thermometer, the same having the usual bore 12 and being provided with a graduated scale formed by markings 14. These marks extend through the body of the glass forming the tube, on both (or all) sides of the central bore. This lateral extension or depth of the scale or division marks 14 imparts to the instrument the anti-parallax feature to be explained hereinafter.

In accordance with the invention, the markings or scale divisions 14 are produced in situ in tube 10 by controlled radiation capable of permanently discoloring the glass. Conveniently, and as shown in Fig. 1, the radiation may be generated by the spontaneous disintegration of a quantity of a suitable radioactive material 16. For protective purposes, as well as to control the direction and size of the beam of radiation employed, the material 16 is contained within a chamber formed in a suitable housing 18, preferably of lead or equivalent material relatively opaque to the radiation. The chamber has an orifice leading to a restricted channel 20 defined by a relatively long wall structure 24 which may be of the same or similar material as housing 18.

The effect of using a narrow channel 20 is to define the shape of the emergent beam of radiation, and to limit the beam spread so as to provide, in effect, a collimated beam of the radiation. In order to enable this radiation source to be directed successively toward the various parts of tube 10 to be discolored, it may be mounted for sliding movement in a direction lengthwise of tube 10 as upon a guide bar 26, and so arranged that the beam of radiation strikes tube 10 in a direction perpendicular to its axis. Further to define the effective shape and position of the areas to be discolored, and to establish the separation of the scale markings, I also employ a screen or stencil 28 formed of material relatively opaque to the discoloring radiation, and having apertures 30 therein corresponding to the desired scale markings. This stencil is preferably placed near the tube 10 so as to produce the desired shadow pattern with considerable accuracy. The stencil or shield may be left stationary as the source 18 is moved along its guide, or (where the scale is being established as a calibrating procedure is being carried out) the shield may have only one aperture and be moved to measured positions along tube 10 for individual production of the desired scale markings.

The shape of the beam of radiation, or of the apertures in stencil 28, may be varied somewhat to produce the desired shape of marks 14. These may be relatively short in horizontal extent, but may equally well completely encircle the tube 10. In any event, the fact that the marks extend completely through the tube 10 (and in the example shown lie on both sides of the bore 12) results in the anti-parallax feature of the invention. It is clear that this feature depends upon the fact that the markings or discolored portions constituting the scale differences be of substantial length as measured in the direction of the line of sight across the tube; that is, the wall thickness must be at least an appreciable fraction of the total diameter of the tube. In the appended claims, this relationship is designated by specifying a wall thickness which is substantial as compared to the bore diameter, or which is at least comparable to said diameter, in order to exclude devices such as mere graduated cylinders in which the wall thickness is very small compared to the internal diameter of the bore.

I have found that any individual scale marking of the kind produced in this way appears sharp and clear to the observer only when his eye is located in the position (lengthwise of the tube axis) occupied by the source 18 when said particular marking was formed. In Fig. 2, for example, the tube 10 is shown as containing a liquid such as mercury providing a meniscus 32 whose position along the tube is to be measured. When the observer's eye is in position "A," the scale marking at the meniscus level (or the two markings between which it lies) appears distinct and clear, and of minimum width in the direction of the tube axis. If the eye is at position "B" (illustrating in an exaggerated manner a parallax error) the markings are broadened and are fuzzy and indistinct. Thus, the observer knows immediately whether his eye is on a level with the meniscus 32, and can readily correct matters if it is not. With conventional scale markings applied only on the surface of tube 10, a reading taken from position B would be grossly in error.

The invention is not limited to the observation of liquid levels. Often it is necessary to set a pointer or the like at a certain position with reference to a scale on a transparent tube. As shown in Fig. 3, the pointer or fiducial element 34 of a movable plate may be so located without parallax error by a similar observation. Such movable plate might be, for example, the vernier scale plate of a precision barometer, or it could represent any form of physical marker whose position is to be read against the scale.

The invention is not limited to the use of a radioactive radiation source, inasmuch as an X-ray tube could equally well be employed, as well as other known sources of ultraviolet, X-ray, beta or gamma radiation; the selection of the most effective radiation source is conditioned to some extent by the composition of the glass employed. Also, the invention can be carried out using glass compositions of the type in which the local coloring is developed by heat treatment after an initial exposure to the radiation. Any combination of a radiation source and glass composition may be used which is capable of producing visible coloration in or through the body of the glass article.

Other variations and modifications in the invention can be employed without departing from the scope of the invention as defined in the appended claims.

I claim:

1. A tubular column instrument formed of transparent glass material and having a wall thickness which is substantial as compared to the bore diameter, said instrument having scale markings formed in situ and extending substantially entirely through the thickness of said material, along spaced diameters of said instrument, said markings being constituted by relatively opaque zones of the glass material spaced apart in parallel relationship along the axis of said instrument.

2. An elongated tubular liquid column instrument formed of transparent glass material of wall thickness at least comparable to the instrument bore diameter and parallel inner and outer faces, and provided with a graduated scale extending lengthwise thereof, said scale comprising a parallel series of spaced markings each relatively narrow in the direction of length of said scale, said markings being constituted by relatively opaque portions integral with the body of said glass material and extending completely through said material from its outer face to its inner face, the opposed surfaces defining the narrow dimension of each marking in the direction of scale length being parallel to one another and both perpendicular to the faces of said glass material, whereby to establish a perpendicular line of sight between pairs of adjacent markings to eliminate parallax errors in the viewing of said scale.

3. The method of making a graduated glass tubular column instrument having scale markings arranged in a line parallel to the axis of said instrument, comprising exposing a tube of glass, whose wall thickness is at least comparable to its bore diameter, to the discoloring action of selected radiation at point spaced along said line, while maintaining the direction of incidence of said radiation at substantially a right angle to said line, the degree of exposure being sufficient to discolor the glass material throughout the extent of the exposed regions cross-wise of said instrument.

4. The method of making a graduated tubular liquid column instrument comprising providing a transparent tubular glass member having coaxial wall faces and of substantial thickness relative to its bore diameter, and exposing spaced parallel aligned narrow band-like areas of the outer surface of said member to a collimated beam of discoloring radiation directed perpendicularly to said surfaces, for a sufficient time to produce relatively opaque spaced scale markings in the body of said member and extending substantially completely through the thickness thereof.

References Cited in the file of this patent

UNITED STATES PATENTS

| | | |
|---|---|---|
| 342,222 | Paull | May 18, 1886 |
| 455,833 | Simpson | July 14, 1891 |
| 507,857 | Tomey | Oct. 31, 1893 |
| 1,136,527 | Herrmann | Apr. 20, 1915 |
| 1,717,128 | Vlastis | June 11, 1929 |
| 1,883,971 | Kryzanowsky | Oct. 25, 1932 |
| 2,515,937 | Stookey | July 18, 1950 |
| 2,515,943 | Stookey | July 18, 1950 |

FOREIGN PATENTS

| | | |
|---|---|---|
| 342,757 | Great Britain | Aug. 5, 1930 |

OTHER REFERENCES

Stookey: Industrial and Engineering Chemistry, vol. 41, No. 4, April 1949, pp. 856–861.